United States Patent [19]

Felice

[11] Patent Number: 5,772,323
[45] Date of Patent: Jun. 30, 1998

[54] TEMPERATURE DETERMINING DEVICE AND PROCESS

[76] Inventor: Ralph A. Felice, 1532 Newport Dr., Macedonia, Ohio 44056

[21] Appl. No.: 329,456

[22] Filed: Oct. 26, 1994

[51] Int. Cl.$^6$ ................................. G01J 5/00; G01J 5/08
[52] U.S. Cl. .......................... 374/127; 374/121; 374/9; 374/45; 364/557; 364/556
[58] Field of Search ................................. 374/127, 121, 374/45, 9, 126, 128; 364/557, 556; 356/45

[56] References Cited

U.S. PATENT DOCUMENTS

| | | | |
|---|---|---|---|
| 3,922,550 | 11/1975 | Crowley et al. | 374/9 |
| 4,142,417 | 3/1979 | Cashdollar . | |
| 4,286,327 | 8/1981 | Rosenthal | 364/498 |
| 4,365,307 | 12/1982 | Tatsukski | 364/557 |
| 4,404,642 | 9/1983 | Rosenthal | 364/557 |
| 4,428,058 | 1/1984 | Vasilieva | 364/557 |
| 4,466,076 | 8/1984 | Rosenthal | 364/557 |
| 4,659,234 | 4/1987 | Brouwer et al. | 374/127 |
| 4,890,933 | 1/1990 | Amith et al. | 374/121 |
| 4,974,182 | 11/1990 | Tank | 374/126 |
| 4,979,133 | 12/1990 | Arima et al. | 364/557 |
| 5,021,980 | 6/1991 | Poenisch et al. | 364/557 |
| 5,125,739 | 6/1992 | Suarez-Gonzalez et al. | 356/45 |
| 5,132,922 | 7/1992 | Khan et al. | 364/557 |

FOREIGN PATENT DOCUMENTS

| | | | |
|---|---|---|---|
| 0134324 | 10/1980 | Japan | 374/126 |
| 60-152924 | 8/1985 | Japan | 374/127 |

OTHER PUBLICATIONS

Andreic., C., "Numerical Evaluation of the Multi–Pair Method of CalculatingTemperature from a Measured Continuous Specrum", Applied Optics, vol. 27, No. 19, pp. 4073–4075, Oct., 1988.
Hiernaut, J., et al, "Submillisecond Six–Wavelength Pyrometer for High–Temperature Measurements . . . ", High Temperature–Hight Pressures, 18, pp. 617–625, 1986.
Hiernaut, J., et al, "Determination of the Melting Point and of the Spectral and Total Emissivites . . . ", 1986.
Cashdollar, K.L., et al, "Infrared Temperature Measurement", Am. Inst. of Physics, 5, pp. 453–463, 1982.
Gardner, J.L. et al, "A Six–Wavelength Radiation Pyrometer", High Temperatures–High Pressures, 13, pp. 459–466, 1981.
Gardner, J.L., "Computer Modeling of a Multi–Wavelength Pyrometer . . . ", High Temperatures–High Pressures, 12, pp. 699–705, 1980.
Svet, D.Y., "OPtimal Photoelectric Pyrometerfor Measuring True Temperatures of Metals by Radiation", High Temperatures–High Pressurs, 11, pp. 117–118, 1979.
Hornbeck, G.A., "A High Speed Ratio Pyrometer", American Insitute of Physics, vol. 3, Part 2, 1962.
Hunter, et al., "Multiwavelength pyrometry: an improved method," Optical Engineering, vol. 24, No. 6, pp. 1081–1085 (Nov./Dec. 1985).

*Primary Examiner*—Diego F.F. Gutierrez

[57] ABSTRACT

The present invention relates to a totally novel device and process useful for the measurement of the temperature of a radiating body. More particularly, the present invention relates to a device that enhances the resolution and repeatability of the measured temperature of the radiating body by fitting a mathematical correlation to the emitted radiation spectra, generating calculated radiation intensities at specified wavelengths using the mathematical correlation, and then generating a suite of individual two-wavelength temperature values, which can be statistically evaluated and averaged for a final, measured temperature. In one embodiment, the device consists of an optical input system which receives a portion of the emitted radiation of a radiating body; a wavelength dispersion device which separates the emitted radiation according to wavelength; a radiation transducer which senses the separated radiation and provides an output corresponding to the respective wavelengths of the emitted radiation; means for generating a mathematical function to correlate the output of the radiation transducer to the corresponding wavelengths of incident radiation; and a means for generating a temperature value utilizing a form of the Planck Radiation Equation. Additionally, the present invention relates to the technique utilized to enhance the resolution and repeatability of the measured temperature.

17 Claims, 10 Drawing Sheets

MULTI-WAVELENGTH PYROMETER

Fractional Residuals; Blackbody at 2000°C

Randomized Planck's Law Values for 2400K

Absorption Spectra of Chemical Species Present in the Target Environment. (Arrows indicate identifications.)

TEMPERATURE DETERMINING DEVICE AND PROCESS

FIELD OF THE INVENTION

The present invention relates to a radiation pyrometer useful for the measurement of the temperature of a radiating body. More particularly, the present invention relates to a radiation pyrometer that enhances the resolution and repeatability of the measured temperature of the radiating body. Additionally, the present invention relates to the technique utilized to enhance the resolution and repeatability of the measured temperature.

BACKGROUND OF THE INVENTION

Radiation pyrometers are known and commercially available. Typically, pyrometers are used to generate a measured temperature of a radiating body. The term "target" is used to indicate the radiating body evaluated for temperature determination, and the term "measured temperature" is used to indicate the value generated by a pyrometer or a pyrometric technique. The measured temperature may, or may not, be the actual temperature of the target.

Pyrometers are particularly useful for measuring target temperatures when the target is positioned in a remote location, or when the temperature or environment near the target is too hostile or severe to permit temperature measurement by other, more conventional, means or when the act of measuring in a contact manner may itself perturb the target temperature. The terms "measuring" and "measure" are use to include all aspects of a pyrometric technique including, but not limited to, energy collection, correlation, data manipulation, the report of the measured temperature, and the like.

Current pyrometers are one of two types: brightness or ratio devices. Brightness and ratio pyrometers both utilize a solution of a form of the Planck Radiation Equation to calculate the target's measured temperature. The Planck Radiation Equation for spectral radiation emitted from an ideal blackbody is $$L_\lambda = \frac{2hc^2}{\lambda^5} [e^{hc/\lambda K_B T} - 1]^{-1} \quad \text{(Equation 1)}$$

where $L_\lambda$=radiance in energy per unit area per unit time per steradian per unit wavelength interval, h=Planck's constant, c=the speed of light, $\lambda$=the wavelength of the radiation, $k_B$=Boltzmann's constant, and T=the absolute temperature.

For non-blackbodies, $$H_\lambda = \epsilon L_\lambda = \epsilon \frac{2hc^2}{\lambda^5} [e^{hc/\lambda K_B T} - 1]^{-1} \quad \text{(Equation 2)}$$

where $H_\lambda$=the radiation emitted, and $\epsilon$=emissivity.

In the brightness method of pyrometry, $H_\lambda$ and $\epsilon$ are measured at a known wavelength, $\lambda$, and, therefore, T can be calculated.

Brightness devices rely upon capturing a known fraction of the radiation from a source in a particular solid angle. Brightness pyrometers known in the prior art are dependent upon knowing the emissivity of the target, as required by Equation 2, supra. Emissivity is the ratio of the radiation emitted by the target to the radiation emitted by a perfect blackbody radiator at the same temperature. Typically, emissivity is unknown or estimated to a low degree of accuracy. Additionally, the emissivity is often a function of the target temperature, wavelength of radiation examined, and history of the target. This limits the utility of brightness pyrometry severely.

In practice, it is left to the user of a brightness pyrometer to estimate target emissivity, usually based upon an analysis of the target's composition. The user must then determine if the target's thermal and environmental history have not appreciably altered the target emissivity. The wavelength or group of contiguous wavelengths of radiation examined are determined by the instrument used, and no selection is possible. It is then left to the user to decide whether or not the indicated target temperature is correct.

Brightness pyrometers are also susceptible to effects of the environment. The gases given off by the target or otherwise present in the atmosphere can selectively absorb radiation at various wavelengths, thus altering the energy reaching the pyrometer and hence the measured temperature. Again, current instruments give no guidance or assistance to the user in surmounting this obstacle.

Ratio pyrometers depend upon graybody behavior. A graybody is an energy radiator which has a blackbody energy distribution reduced by a constant, known as the emissivity, throughout the wavelength interval examined. Ratio pyrometers detect the radiation intensity at two known wavelengths and, utilizing Planck's Equation, calculate a temperature that correlates to the radiation intensity at the two specified wavelengths.

One form of the Planck Radiation Equation useful for ratio pyrometry is expressed as $$T = \frac{C'(1/\lambda_1 - 1/\lambda_2)}{\ln R - 5\ln(\lambda_2/\lambda_1) - \ln(K_1/K_2)} \quad \text{(Equation 3)}$$

where T=absolute temperature;

$\lambda_i$=specific wavelength chosen;

C'=second radiation constant=$hc/k_B$;

R=ratio of radiation intensity at $\lambda_1$, to that at $\lambda_2$; and $K_i$=instrument response factor at each wavelength chosen.

Here the low-temperature, short-wavelength approximation has been made; i.e., $[e^{hc/\lambda k_B T}-1]$ has been replaced with $[e^{hc/\lambda k_B T}]$.

Tradeoffs must be made in the design of ratio pyrometers, particularly in the wavelengths selected for inspection. Planck's Equation yields higher precision when the selected wavelengths are further apart. However, broadly spaced wavelengths permit extreme errors of indicated temperatures for materials that do not exhibit true graybody behavior. In practice, the two distinct wavelengths are typically chosen close together to minimize target emissivity variations, and the resulting diminution of accuracy accepted as a limitation of the pyrometric device.

Ratio devices are also affected by gaseous absorptions from the workpiece or environment. If a selective absorption occurs for either of the two wavelengths fixed by the instrument, the measured temperature will be incorrect.

Both brightness and ratio devices are therefore critically dependent on target emissivity and atmospheric absorptions in the region under study.

There is another, more subtle error to which both brightness and ratio devices are prone. If the measuring device has a significant bandwidth at the wavelengths utilized, a simple emissivity correction will not suffice for a target with spectral variation of emissivity. The emissivity correction is treated as a variable gain for both classes of devices (brightness and ratio), and is therefore a linear correction. If the bandwidth is large the contribution from neighboring wavelengths of different emissivity will render the resulting radiation intensity variation with temperature non-linear, since the Planck function is non-linear. This implies that there is no single emissivity correction for certain targets if the bandwidth is large. Furthermore, if any element in the optical path has a spectral transmission dependence, the same error applies; no single gain factor can correct for such an optical element (e.g., a gaseous, absorbing atmosphere, a glass window or lens, a mirror, etc.).

Experimenters have investigated multi-wavelength pyrometry for some time. G. A. Hornbeck (Temperature: Its Measurement and Control in Science and Industry, 3 (2), Reinhold, N.Y., 1962) described a three-wavelength device that could measure temperatures independent of target emissivity if the emissivity variation was linear over the wavelengths examined. The works of Cashdollar and Hertzberg (Temperature: Its Measurement and Control in Science and Industry, 5 453–463, American Institute of Physics, New York, 1982; U.S. Pat. No. 4,142,417) describe temperature measurement of particulate matter and gas in coal dust explosions using six-wavelength and three-wavelength devices utilizing a least squares fit to Planck's Radiation Equation under the assumption that the particles are essentially graybodies and that the dust cloud is optically thick. Gardner et al. (High Temperature-High Pressures, 13, 459–466, 1981) consolidated the contents of a series of papers on the subject. Gardner extends the concept of Hornbeck as well as the work of Svet (High Temperature-High Pressures, 11, 117–118, 1979), which indicated that emissivity could be modeled as linear over a range of wavelengths for a number of materials. Also of interest is a previous publication by Gardner (High Temperature-High Pressures, 12, 699–705, 1980), which discusses coordinate spectral pairs of measured intensity and the associated wavelength. Differences between all possible pair combinations are calculated, and the target emissivity estimated. Use of the emissivity with measured intensities permits calculation of the target temperature. The work of Andreic (Applied Optics, Vol. 27, No. 19, 4073–4075, 1988) calculated the mean color temperature from many spectral pairs and determined that detector noise of only 1% would produce intolerable effects on measurement accuracy. The references of Hornbeck, Cashdollar, Hertzberg, Gardner, Svet, and Andreic, discussed above, are incorporated herein by reference.

In contrast, the present invention measures the radiation intensity at numerous wavelengths of extremely narrow bandwidth to generate a large number of coordinated data pairs of primary data points, fits the primary data points to a mathematical function, generates a statistically significant number of processed data points from the mathematical function, calculates an individual two-wavelength temperature for several pairs of processed data points, inspects the results for internal consistency, and numerically averages the appropriate ensemble of individual two-wavelength temperatures to generate the measured temperature. A data point is defined as a wavelength and its associated (spectral) intensity such that if each were substituted into Equation 1 a unique temperature would result. A processed data point is a data point as described above except that the spectral intensity is generated by the invention's mathematical function. A pair of processed data points, hereafter known as a generating pair, is required to generate a temperature by the use of Equation 3, the formula for ratio pyrometry.

Nothing in the prior art envisions generating a non-Planckian mathematical function to fit primary data points, the calculation of multiple processed data points, and the numerical averaging of the multiple processed data points to generate a measured temperature of extreme accuracy and precision with an associated tolerance. In contrast to the limited capabilities of previous techniques, the present invention has demonstrated an accuracy of measured temperature to ±5° C. at 2500° C., or ±0.15%, with a reproducibility of ±0.015%.

It also yields a tolerance—a measure of accuracy for the indicated temperature—which has never been offered before. It is an extremely useful feature, in that its result is that the user immediately knows to what degree the measurement just made is to be relied upon. This is in stark contrast with prior practice. The accuracy of pyrometers is typically specified by their manufacturers. This specification means that when the target is a blackbody (or possibly a graybody) and the environment does not interfere, the instrument will return a measurement of the specified accuracy.

But measurements of real interest occur with targets and environments of unknown characteristics. The current invention detects whether the target or the environment are not well behaved. In the case of the target this can mean exhibiting other than graybody behavior; in the case of the environment this might result from other than gray or neutral density absorption. In spite of such deficiencies, the present invention extracts the correct temperature. The tolerance reported with the temperature indicates how successful that extraction was.

The present invention also has a unique advantage with respect to immunity from noise. As has been previously described, one reason to choose the wavelengths close together for ratio temperature measurement is to eliminate the variation of emissivity as a contributing factor to the measurement error. The rationale is that if the wavelengths are close together the change in emissivity is likely to be small. However, choosing the wavelengths close together maximizes the effect of noise. The magnitude of the noise generally remains constant throughout the spectrum. Choosing the wavelengths close together insures that the intensity will not differ much between the two wavelengths, thus making the noise contribution a larger fraction of the measured signal.

The invention overcomes this problem by using the weight of the entire spectrum collected to fix each processed-intensity data point. Thus processed data points can be chosen arbitrarily close together without magnifying the noise contribution. Observation and modeling show that the contribution of noise is actually less than that expected from evaluating the expression for error for the extremes of wavelength measured. The error associated with any two wavelength/intensity pairs can be calculated using differential calculus if the error is small:

$$\frac{dT}{T} = \frac{T}{C'} \frac{(\lambda_1 \times \lambda_2)}{(\lambda_1 - \lambda_2)} \frac{dR}{R} \qquad \text{(Equation 4)}$$

where dR=error in the ratio, and
R=ratio of intensities at two wavelengths.

Here the term dR/R can be replaced with the infinitesimal, $\Delta R/R$, where $\Delta R$ is the error in the ratio, and similarly, dT/T can be replaced with $\Delta T/T$ where $\Delta T$ is the error in temperature. The equation thus becomes:

$$\frac{\Delta T}{T} = \frac{T}{C'} \frac{(\lambda_1 \times \lambda_2)}{(\lambda_1 - \lambda_2)} \frac{\Delta R}{R} \qquad \text{(Equation 5)}$$

Equation 5 can be used to calculate the maximum expected error, which can be compared to the error actually observed. The observed error of the invention has uniformly been smaller than the calculated value. Equation 5 further points out that the accuracy observed to date is not the limit of the accuracy that can be expected. The invention is calibrated according to a source of radiant intensity, instead of a standard source of temperature. Therefore, if the total error in radiant intensity, $\Delta R/R$, is reduced to 1%, the expected error at 2500° C. is ±0.10%.

If the target exhibits graybody behavior in any spectral region, it is also possible for the present invention to quantify the target emissivity in all regions. That is, the spectral emissivity for the entire wavelength range of the data can be quantified once the temperature is known. Once quantified, changes in emissivity can identify changes in the target as a function of various external effects (time, temperature, chemistry, etc.), as well as identify changes in the target environment, such as off-gassing, reactions, or material decomposition.

In addition, the choice of a source of radiance as the calibration standard extends the useful operating range of the present invention well above currently available temperature calibration standards. Current pyrometers are calibrated by exposing their optical inputs to blackbody sources at the temperature desired and in some fashion (electrical or mechanical) forcing the output of the pyrometer to agree with the blackbody temperature. The limit for such a direct temperature calibration is 3000° C., the highest temperature a blackbody source can currently attain reproducibly. The invention described herein, by way of contrast, need only be calibrated by a source of radiant intensity (that is, a device whose emitted radiation is known as a function of wavelength, such as a standard lamp) to yield accurate temperatures. There is no need to expose the invention to the range of desired temperatures for it to be capable of measuring that range, a feature not possible using the prior art.

SUMMARY OF THE INVENTION

The present invention is a method to measure the temperature of a radiating body, and a device which utilizes the method.

The measurement of temperature is a problem in many process industries: aluminum, iron and steel, ceramics, cement, glass, and composites are a few examples. Non-contact, and therefore non-perturbing, techniques of radiation pyrometry would be preferred but for the weakness that, as currently practiced, they require knowledge of the target's emissivity. This parameter is defined as the ratio of the radiation emitted by the sample to that of a blackbody (ideal) radiator at the same temperature.

Unfortunately emissivity is a function of the target's composition, morphology, temperature, and mechanical and thermal histories, and of the wavelength at which the measurement is made. For some materials, it changes while the temperature measurement is being made. Prior to the present invention, this central difficulty has proven so intractable that the growth of radiation pyrometry has been stunted.

The effect of this difficulty is to preclude trustworthy temperature determination without allowance for emissivity within the measurement. The historically recommended method of accomplishing this is to encase the experiment in a blackbody cavity, thereby allowing the radiation to come to thermal equilibrium. Clearly this is not a practical solution.

The commercially available technique of ratio, or two-color, pyrometry attempts another approach: canceling the emissivity by dividing two measurements of the radiation emitted and calculating the temperature from this ratio. This works in principle but there is still no guarantee that the emissivity is constant at the wavelengths chosen. This concern is the basis for the instrument maker's dilemma: whether to opt for emissivity cancellation or precision. Emissivity cancellation and precision are mutually exclusive in a ratio instrument, and the choice is signaled by the distance between wavelengths. The closer the wavelengths the more likely the emissivities are to cancel; the farther apart the larger the magnitude of the resultant signal, and thus the greater the precision.

The present invention, which is suitable for measuring the temperature of any radiating body that is above ambient temperature, quantifies radiation intensity at multiple wavelengths, generates a mathematical function to fit the primary data points, calculates multiple processed data points using the mathematical function, utilizes multiple pairs of the processed data points to calculate individual two-wavelength temperature estimates, inspects the results for internal consistency, and numerically averages the estimates to generate a measured temperature of great accuracy and a tolerance, which is a quantification of that accuracy. The invention also permits evaluation of the quality of the emission spectra being measured, and identifies whether the target exhibits true graybody behavior and, if it does not, which portions of the spectra will generate erroneous measured temperatures.

The present invention's ability to quantify radiation intensities at multiple wavelengths with a single sensor minimizes temperature measurement errors due to variations between sensors. Removing this source of intrinsic error permits statistical manipulation of the collected data to enhance the accuracy and reproducibility of the temperature measurement technique. Fitting the primary data points to a mathematical function accommodates target deviations from true graybody behavior, as well as further minimizing the effects of thermal, detector, and instrument noise.

The present invention provides a process for measuring temperature, comprising quantifying the radiation intensity emitted by a radiating body at no less than 4 distinct wavelengths; generating a mathematical function which correlates the radiation intensities to the corresponding wavelength at which the radiation intensity was quantified; and generating a temperature value utilizing Equation 3 and no less than two processed data points generated utilizing the mathematical function. The invention may also be practiced using three or more processed data points generated utilizing the mathematical function. The invention also encompasses the use of only quantified radiation intensity which exhibits emission spectra consistent with known thermal radiation effects for generation of the mathematical function. Data may be said to be consistent when the processed data points are computed at wavelengths where the fractional residuals of the quantified radiation intensity exhibit an RMS value substantially equal to zero or where the quantified radiation intensity exhibits magnitudes of fractional residuals no less than −0.1 and no more than 0.1, preferably no less than −0.05 and no more than 0.05, most preferably no less than −0.02 and no more than 0.02. The invention may also be used to determine the emissivity of the radiating body, as well as the absorption of the intervening environment between the radiating body and the device utilized to quantify the radiation intensity of the body. Additionally, the chemical species present in the environment between the radiating body and quantifying device may be identified and measured.

The invention also includes averaging the individual temperature values calculated utilizing Equation 3 and no less than three processed data points, and the determination of the tolerance of the resulting temperature value by calculating the statistical variation of the temperature values calculated utilizing Equation 3 and no less than three generating pairs. One pertinent statistical variation is the determination of the standard deviation of the average of the individual temperature values calculated.

The invention also encompasses a device, comprising an optical input system, a wavelength dispersion device, a radiation transducer, a means for generating a mathematical function to correlate the radiation transducer output to the corresponding wavelengths of incident radiation; and a means for generating a temperature value utilizing Equation 3 and no less than two processed data points generated utilizing the mathematical function, as well as all the other capabilities described herein.

The present invention thus provides a process and apparatus for temperature determination which exhibits improved accuracy, noise immunity, great adaptability to varied temperature measurement situations, and unlimited high temperature response. In addition, the tolerance of the measured temperature is reported, temperature measurements are made independent of knowledge of the target emissivity, and all corrections are made digitally (in a mathematical expression, leaving the hardware completely versatile). These features provide a method and device which are effective in non-ideal, i.e., absorbing or reflecting, environments.

Other advantages will be set forth in the description which follows and will, in part, be obvious from the description, or may be learned by practice of the invention. The advantages of the invention may be realized and attained by means of the instrumentalities and combinations particularly pointed out in the appended claims.

DETAILED DESCRIPTION OF THE INVENTION

The invention relates to a non-perturbing method for the measurement of elevated temperatures, and an apparatus to utilize the method.

The method of the instant invention includes the measurement of thermal radiation at multiple wavelengths, representing the measurements of thermal radiation by an analytical function, determining the useful range of wavelengths used for thermal radiation measurement, and testing calculated temperatures based upon multiple pairs of measured thermal radiation for consensus. Additional steps of calibrating the apparatus for system optical response, and for displaying the calculated consensus temperature, or activating a device based upon the calculated consensus temperature, are also encompassed by the invention.

The apparatus of the invention is any device, or collection of devices, which is capable of separating thermal radiation into its spectral components, transducing the spectral components at three or more wavelengths, generating an analytical function to represent the transduced radiation, determining the range of the analytical function where the transduced radiation is within a specified tolerance, and calculating a consensus temperature based upon two or more points on the generated analytical function.

Figure 1:
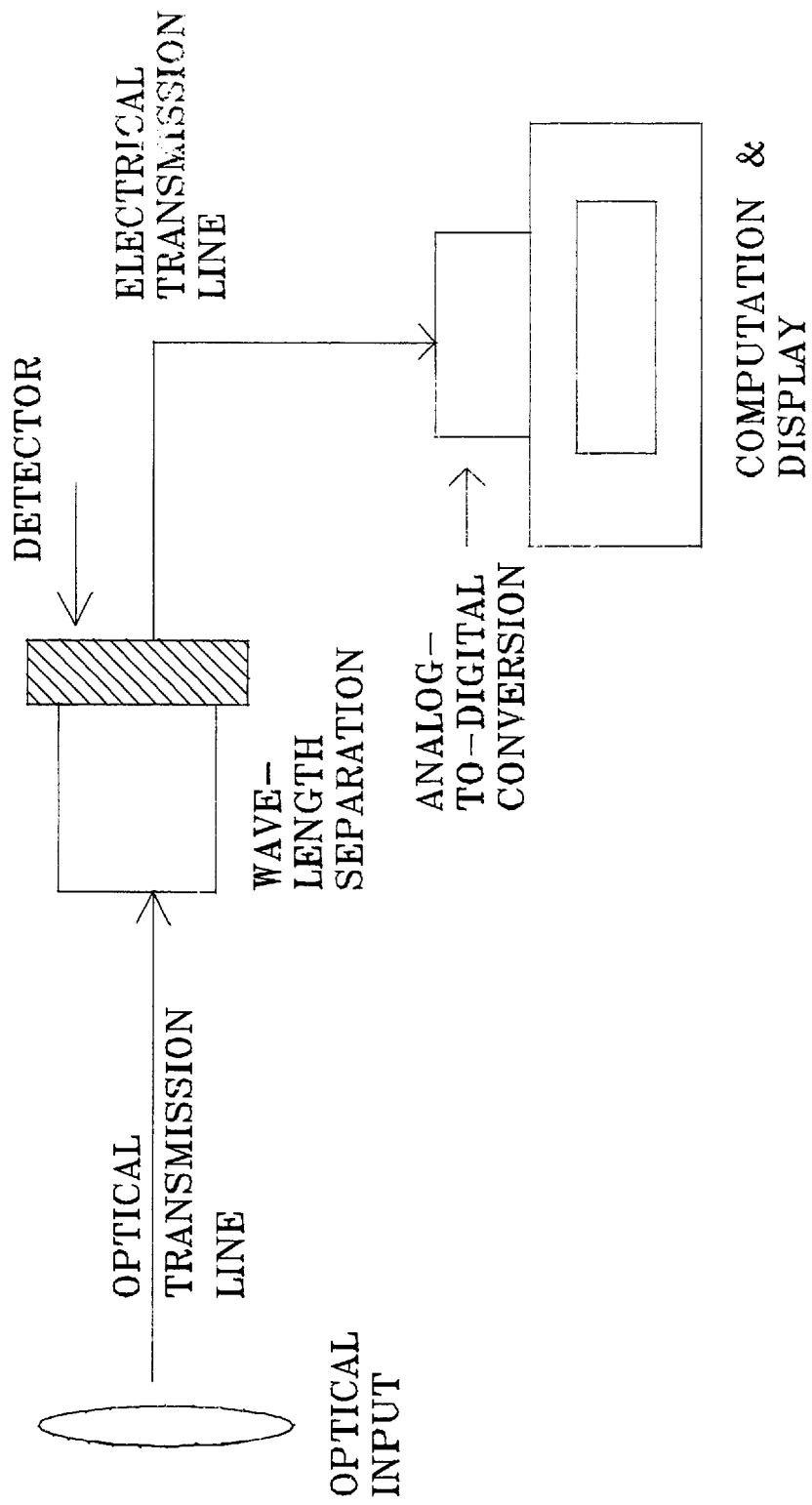
FIG. 1 A conceptual schematic of the invention

Reference will now be made to the preferred embodiment of the apparatus, an example of which is illustrated schematically in FIG. 1. As illustrated in the figure, the apparatus of the invention comprises an optical input, an optical transducer, and computation means.

Several embodiments of the optical input system have been utilized. A preferred embodiment utilized a commercially available camera body, in this case a Nikon F3. Thus, any appropriate compatible lens can be used. Specifically, a Tamron SP 28-135 mm F/4 zoom lens was utilized.

The back of the camera was modified to accept a fiber optic connector that held the end of a fiber optic cable at a location corresponding to both the center of the focusing reticule and the film plane. Depicted as the Optical Transmission Line in FIG. 1, the fiber optic cable is used to couple the optical input system with the optical transducer.

The target could thus be observed through the camera viewfinder and the appropriate portion of the target brought into focus in the traditional manner. The camera shutter was then locked open to transfer the incoming radiation to the pyrometer. The fiber optic cable was PCS 1000, a plastic-clad single-strand fiber with a 1-mm fused-silica core, manufactured by Quartz and Silice and available from Quartz Products, P.O. Box 1347, 688 Somerset St., Plainfield, N.J. 07060. As is clear to one skilled in the art, numerous methods and devices capable of directing thermal radiation to the transducer are encompassed by the invention, including but not limited to lenses, mirrors, prisms, graded-index fiber optics, holographic and replicated optical elements, electrical and magnetic equivalents of lenses and mirrors, direct radiation, and the like.

The second end of the fiber optic cable terminated in a flat-field spectrograph which dispersed the light into its spectral components. The spectrograph used in the preferred embodiment, model CP-200 manufactured by Instruments SA (of 6 Olsen Ave., Edison, N.J. 08820-2419), was fitted with a concave holographic grating of either 75 or 200 lines/mm which provided dispersion of 0.9 or 0.6 nm, respectively, when coupled with a model 1462 detector manufactured by EG&G Princeton Applied Research, P.O. Box 2565, Princeton, N.J. 08543-2565. The model 1462 detector is a linear diode array with 1024 elements on 25 $\mu$m spacing. An typical order-sorting blocking filter limits the spectrum to wavelengths longer than 400 or 500 nm.

The flat field spectrograph and linear diode array comprise the radiation transducer of the preferred embodiment. The present invention encompasses any means for transducing the spectral components of the thermal radiation into a signal which may be used to generate an analytical function to represent the radiation. The transduced signal could be pneumatic, hydraulic, optical, acoustic or gravimetric, but is more typically electrical. Other acceptable transducers include, but are not limited to, linear diode arrays, charge coupled devices, charge injection devices, infrared focal plane arrays, multiple photocell arrays, and single element detectors equipped with multiple wavelength filters, absorbers, or optical systems capable of separating the spectral radiation.

In the preferred embodiment, the transducer generates an analog electrical signal, which is converted to an equivalent digital signal by a PARC Model 146 OMA A/D converter.

The digitized signal thus resulting quantifies the thermal radiation intensity at 1024 discrete wavelengths (collected simultaneously through a common optical system) and is stored numerically in a computer file for post-processing.

Correction (intensity calibration) of the digitized data so that the discrete spectral intensities have the appropriate relative magnitude requires a system response curve. This is generated separately by collecting data using a standard lamp as the target. The resulting system response curve provides correction through a matrix multiplication of subsequent measurements, and need not be repeated unless apparatus components are reconfigured.

This calibration of the system was effected using a standard of spectral irradiance, such as an Eppley Laboratories 100 watt Quartz Iodine lamp. From Equation 5, $$\frac{\Delta T}{T} = \frac{T}{C'} \cdot \frac{(\lambda_1 \times \lambda_2)}{(\lambda_1 - \lambda_2)} \cdot \frac{\Delta R}{R}$$

it can be seen that, for typical values of temperature and wavelength, the error in temperature is significantly smaller than the error in the irradiance calibration. For example, if a 1% irradiance calibration were utilized to calibrate a system at wavelengths 550 and 900 nanometers the resulting error in temperature at 1000 K. would be 0.1%, or 1 degree.

Figure 2:
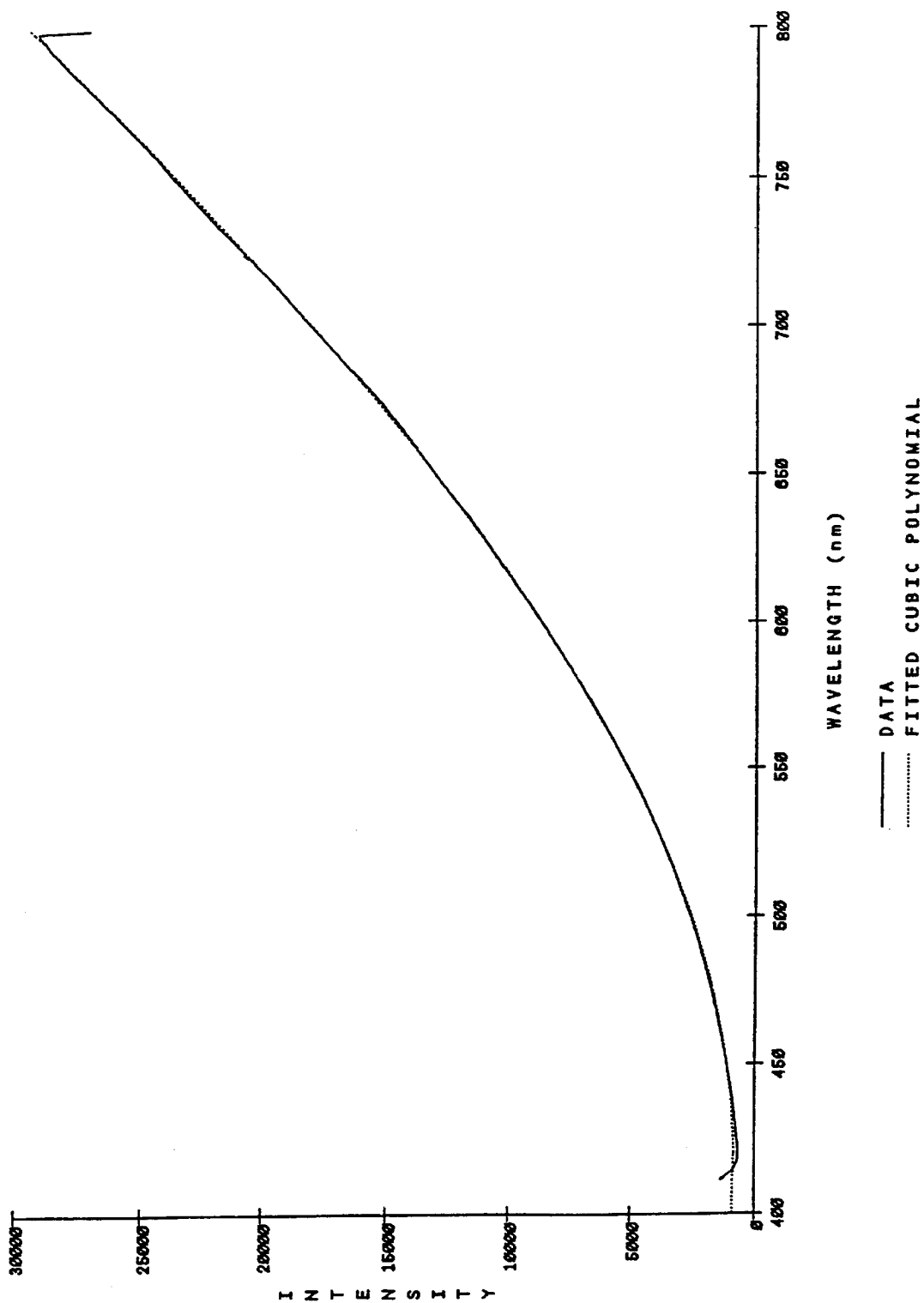
FIG. 2 A graph of the data and of the mathematical function (an intermediate output of the invention) for 2000° C.

The corrected digitized data are then represented analytically by fitting these data to a mathematical function. It has been found that several non-Planckian mathematical expressions can represent thermal radiation well: exponential and logarithmic functions, and polynomials of second, third, fourth, and higher orders. In the case of the quadratic and higher order polynomials the method of orthogonal polynomials can be used. FIG. 2 shows a corrected data set and the fit of that set on the same axes.

If every combination of two wavelength intensities were used to calculate the target temperature, more than 500,000 calculations of temperature would be performed. While this can be easily done using currently available microcomputers, it is neither necessary nor desirable. Better results are obtained when an analytical function is used to represent the data, and subsequent calculations use the analytical form.

As described in Equation 1, above, a general statement of The Planck Radiation Equation for spectral radiation emitted from an ideal blackbody is $$L_\lambda = \frac{2hc^2}{\lambda^5} [e^{hc/\lambda K_B T} - 1]^{-1}$$

Defining the radiation constants C and C' by the expressions $$C = 2hc^2, \text{ and } C' = hc/k_B,$$

Equation 1 can be manipulated to read $$\frac{L_{\lambda_1}}{L_{\lambda_2}} = \frac{(\lambda_2)^5}{(\lambda_1)^5} \exp\left[\left(\frac{C'}{T}\right) \times \left(\frac{1}{\lambda_2} - \frac{1}{\lambda_1}\right)\right] \quad \text{(Equation 6)}$$

where the usual short wavelength assumption has been made. The temperature can then be calculated using the expression $$T = \frac{C'\left(\frac{1}{\lambda_2} - \frac{1}{\lambda_1}\right)}{\ln R - 5\ln(\lambda_2/\lambda_1)}$$

where the ratio of spectral intensities, $L_{\lambda_1}/L_{\lambda_2}$ is represented as R. This solution is the basis of all ratio, or two-color, pyrometry.

Differentiation of this expression to evaluate the error in the calculated temperature (dT/T) yields Equation 4, $$\frac{dT}{T} = \frac{T}{C'} \cdot \frac{(\lambda_1 \times \lambda_2)}{(\lambda_1 - \lambda_2)} \cdot \frac{dR}{R}$$

The error in the calculated temperature is thus a product of three terms. The first term, T/C', is fixed by the target temperature and the radiation constant. The third term, the uncertainty in the ratio of spectral intensities dR/R, is a function of the specific equipment used to measure target spectral intensity. Inspection of Equation 4 indicates that the uncertainty in temperature, dT/T, is directly proportional to the second term, $(\lambda_2 \times \lambda_1)/(\lambda_1 - \lambda_2)$ which is known as the effective wavelength.

Rearranging the expression for effective wavelength in Equation 4 leads to $$\frac{\lambda_2}{1 - (\lambda_2/\lambda_1)}$$

where $\lambda_2 < \lambda_1$. Inspection of this expression of the effective wavelength term indicates that the expression is minimized where $\lambda_2$ is as small as possible, and $\lambda_1$ is as large as possible.

Use of Expert System Software

The use of specialized software, known generally as "expert system software" is applicable to the present invention. The expert system software performs, among other functions, the following:

Collects data

Corrects data for background and for instrument, environment, and target (if known) optical response Discards obviously non-thermal data Represents data by an analytical function Determines the useful spectral range of the data Tests the data for consensus temperature Either
  a) Uses the consensus range to report the temperature and its tolerance
  b) Reports that there is no consensus.

Thus, the invention provides a measured temperature and quantifies the accuracy of the result obtained by a statistical evaluation of the resultant suite of calculated temperatures.

The invention also identifies those situations when the process and apparatus of the invention are unsuccessful. This typically means that some environmental parameter is perturbing the data. In this event, suitable optics can be utilized, due to the extreme flexibility of the apparatus, to selectively filter, remove or compensate for the perturbing effect. Additionally, portions of the emission spectra that exhibit behavior inconsistent with known thermal radiation effects can be excised from the evaluated data set, and erroneous measurements based upon inconsistent segments of the evaluated spectra can be avoided.

Figure 6:
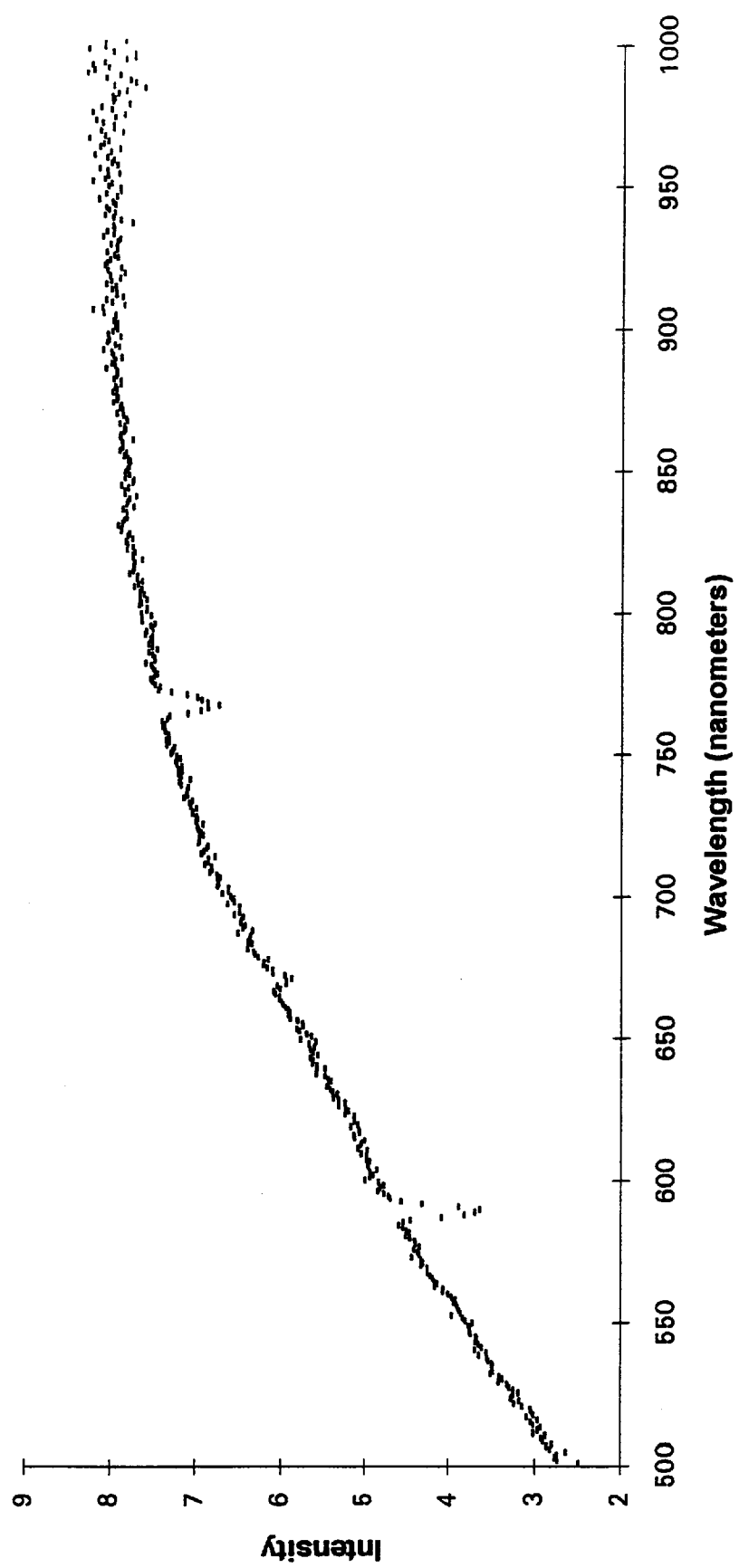

FIG. 6 depicts a collection of raw emissivity data points, and clearly shows absorption bands at 590 nm, 670 nm and at 770 nm. These excursions are non-thermal, systematic errors. Although the present invention minimizes the effect of such excursions, excising the non-thermal data or selecting intensity values from portions of the data not affected by the non-thermal error can enhance the quality of the temperature determination and increase the accuracy of the measurement.

The invention may also maintain a database of previous temperature measurements for a specific target. Subsequent temperature measurements of the same or similar targets may be compared to the software's database values to provide an internal check of the data. Emissivity/wavelength relationships, in particular, may be thus critically evaluated.

Except for the collection of raw data points, generating a mathematical function to fit the data points, the calculation of individual two-wavelength calculated temperatures, the numerical averaging of the individual two-wavelength calculated temperatures to generate a measured temperature, and the discarding of values not meeting the statistical criteria chosen, the specifics related to measuring target temperatures are not, however, critical to the present invention.

EXAMPLE 1

A series of temperature measurements were made using two commercially available NIST-traceable blackbodies as targets. The high temperature source was Model BWS156A (Electro Optical Industries Inc., P.O. Box 3770, Santa Barbara, Calif. 93130), covering the range from 1000° C. to 3000° C. The low temperature source was Model 463/101C (Infrared Industries, 12151 Research Parkway, Orlando, Fla. 32826), covering the range from 100° C. to 1000° C. Blackbody setpoints from 600° C. to 3000° C. were evaluated using the invention. Table 1 is an example of such an evaluation. In general, two measurements were made at each setpoint; these show the exceptional reproducibility of the invention.

The sequence of operation of the invention began with the collection of raw data. The optical input portion of the apparatus was positioned to permit the radiation emitted from the target to be directed onto the sensor, and the spectral emissions were quantified at multiple wavelengths.

The first computational step was that the background was subtracted from the raw data. It had been collected in the same manner as the raw data, but without the target's radiation being presented to the optical input. The background is typically electronic in nature (e.g., dark current) but may have a physical component: either reflections or emissions.

The next step was the correction of the data for instrument factors: i.e., transmittivity/reflectivity of every optical element in the collection and transmission path and adjustment for the various responsivities of the individual detector elements. The corrected data was then fitted to a numerical expression, such as a polynomial of high-enough order (quadratic or higher), to adequately represent the data. A cubic expression was determined to be adequate. An example of the fit of the numerical expression to raw data points from Example 1, an evaluation at 2000° C., is depicted in FIG. 2.

Figure 3:
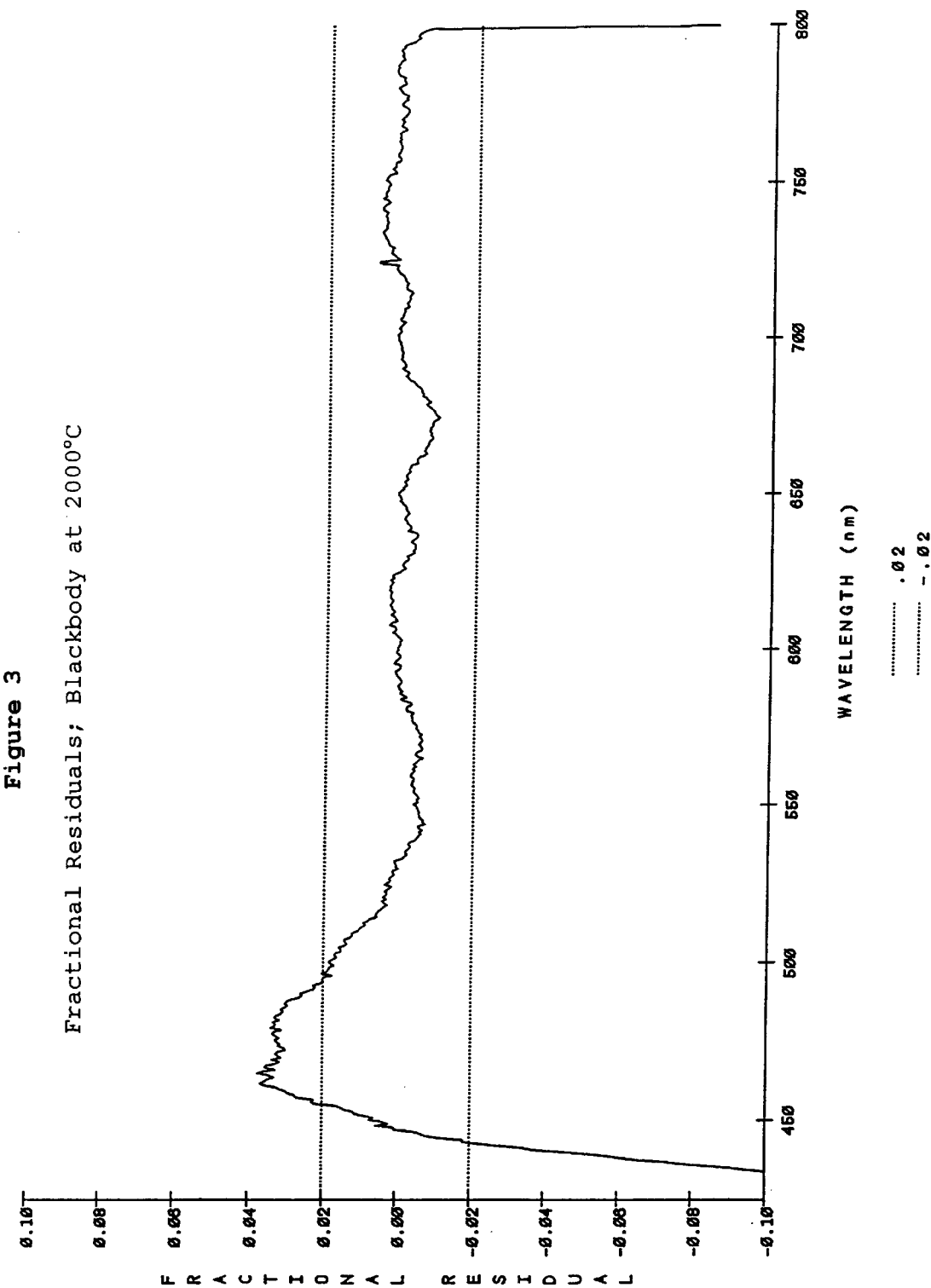
FIG. 3 Fractional residuals for the mathematical function of FIG. 2, with systematic variations less than 0.02

The residuals (data values of intensity subtracted from corresponding values from fitted curve) are helpful in quantifying the accuracy of an evaluation. The fractional residuals (residual divided by corresponding data value) from the 2000° C. fit selected above are depicted in FIG. 3. Inspection of FIG. 3 indicates that fractional residuals with a systematic error less than 0.02 may be found between 500 nm and 800 nm. This boundary of ±0.02 has been found to be a useful criterion as to whether or not the data is well represented by the analytical function where systematic variations from zero are seen in the fractional residuals. Where the fractional residuals show variations of a random nature, i.e., their RMS value is zero, there appears to be no upper limit to their magnitude for good results to be obtained. Therefore, the portion of the data between 500 and 800 nm was selected as the useful range of the evaluation.

Another measure of the quality of the analytical representation of the data is the coefficient of determination. Coefficients of determination such as that shown in Table 6, greater than 0.99, are often observed. While this indicates that the data are well-represented by the analytical function, the reverse is not true. For example, the coefficient of determination for Table 7 is 0.910.

The numerical expression that had been fitted to the data must then solved for 6–50 values of intensity of radiation for a series of wavelengths chosen incrementally. The increment is usually 25 or 50 nanometers, and the range over which they are chosen is determined by the temperature of the object. These are the pairs from which the temperatures are calculated. The number of individual temperature values, N, is j items taken 2 at a time, $_jC_2$ or $$N = \frac{j!}{(j-2)! \times 2!}$$

For this example, j=6, and 15 intensity pairs were used to generate 15 individual temperature values.

These values were then inspected for consensus; i.e., to see whether or not they yielded the same temperature. Since the entire spectrum is utilized in a systematic way, it is possible to determine from this inspection which areas of the collected spectrum yield values which are in general agreement with each other. In this way absorptions and emissions from the optical environment as well as non-graybody areas of the target spectrum can be eliminated, and the previous steps repeated until an acceptable consensus temperature is determined, or it is determined that the apparatus, as configured, is not capable of generating a consensus temperature within the acceptable error tolerance.

The consensus temperature is judged worthy of reporting as the object temperature if a significant portion of the spectrum yields a consensus value which, when averaged, displays a standard deviation within an acceptable tolerance range, typically of on the order of 0.25% of the absolute temperature. A significant body of experience using standards of known temperature as the objects to be measured indicates that the standard deviation of the consensus temperature can be considered as the tolerance to which the temperature is known.

EXAMPLE 2–4

Multiple temperature evaluations were made in the manner described in Example 1 of blackbody targets at temperatures between 850° C. and 2500° C. The results are reported in Tables 2–4.

EXAMPLE 5

Evaluation of the error correcting capability of the invention was accomplished by intentionally injecting random error (noise) into both generated (artificial) and real data sets, but otherwise practicing the algorithm of the invention as described above.

Figure 4:
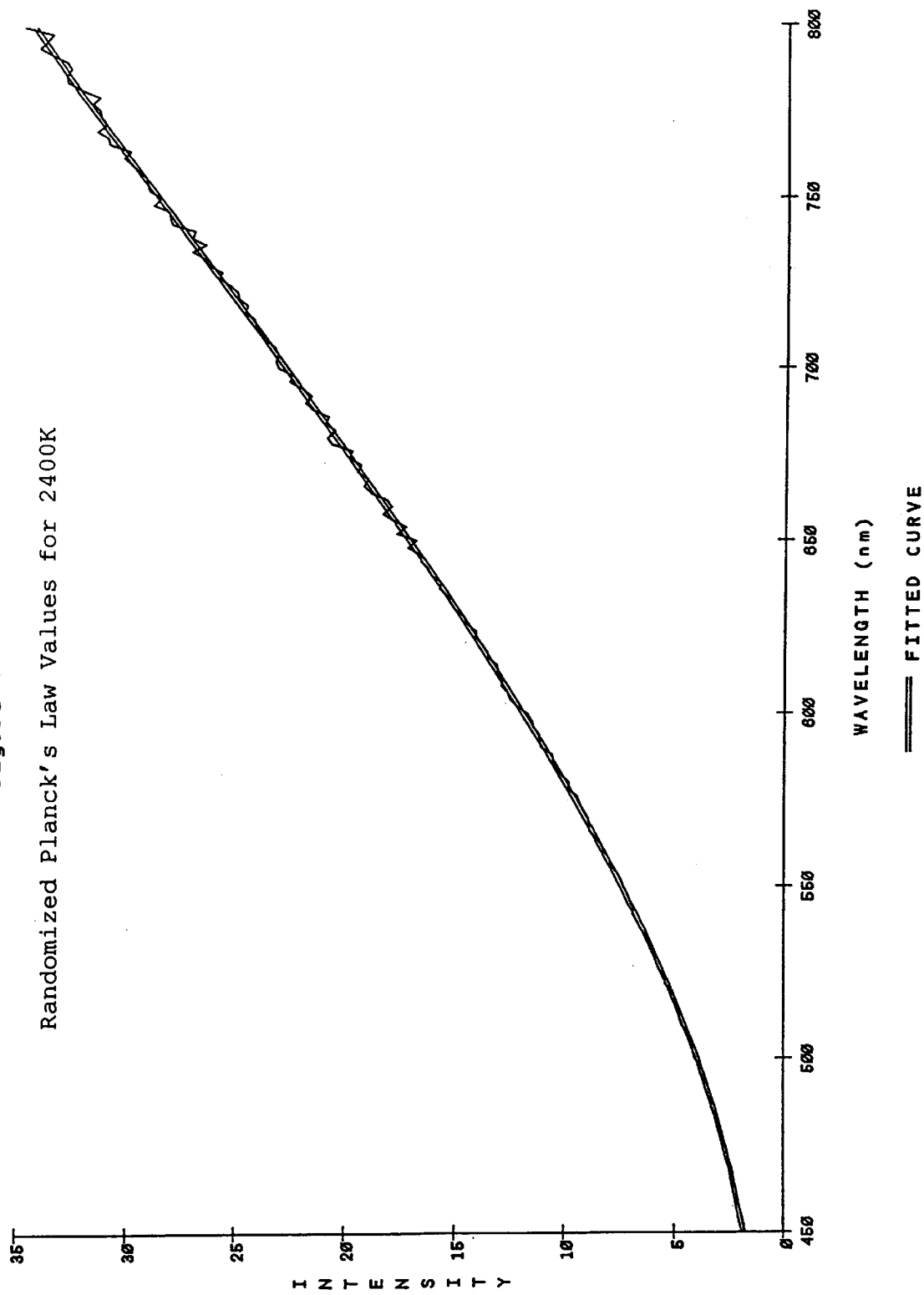
FIG. 4 An example of a graph of noisy data with a graph of the mathematical function generated by the invention superimposed FIG. 5 A graph of the fractional residuals for a random noise test illustrating fractional residuals with an RMS value of zero or substantially zero FIG. 6 Data collected by the invention and corrected for instrument response FIG. 7 The data of FIG. 6 with 10% random noise added FIG. 8 Spectral data collected by the invention in an off-gassing environment, corrected for instrument response FIG. 9 Spectral data collected immediately after FIG. 8 but with the environmental off-gas purged away FIG. 10 Absorption spectra of chemical species present in the target environment
Figure 5:
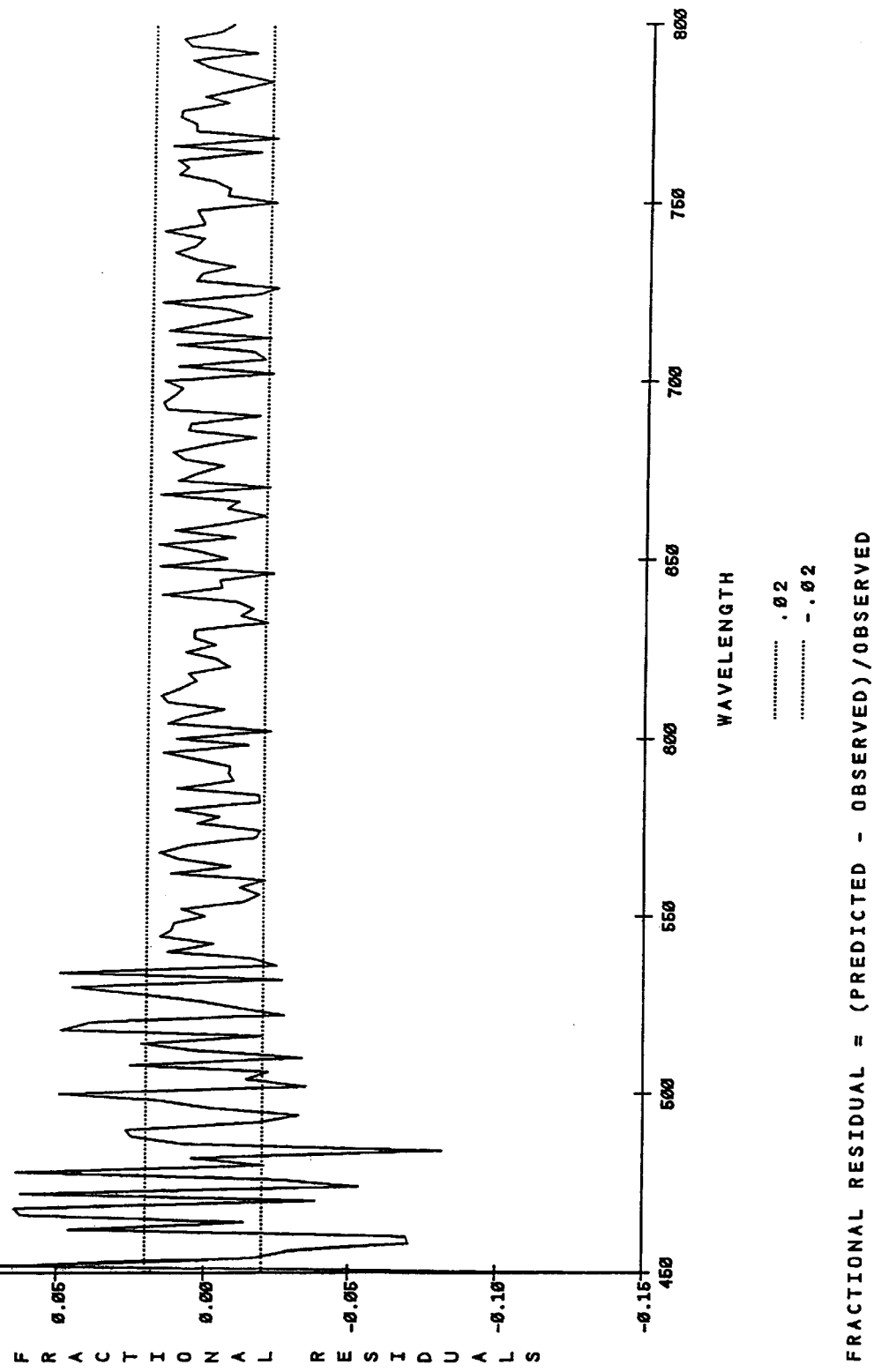

Tables of spectral intensities at various wavelengths for various temperatures were generated using Planck's law for a number of temperatures. These data then had varying amounts of error inserted over their spectral ranges using a random number generator. Specifically, error of ±10% was added from 450–495 nm, ±5% for 496–517 nm, and ±2% for 518–800 nm. FIG. 4 depicts the resulting intensity/wavelength curve for 2400 Kelvins and the fitted curve for the same region. FIG. 5 depicts the fractional residual values resulting from a cubic curve fit to the artificially noisy raw data. The residual evaluation for this example clearly shows the noise added. The results of this and other artificial random noise tests are tabulated in Table 5. Inspection of this table shows the invention returns a value closer to the temperature used to generate the uncorrupted spectra than that returned by simple multi-value averaging; the average error of the invention is less than half that of simple averaging methods.

To extend the noise evaluation to real data, error was injected to real data sets selected randomly. FIG. 6 depicts the selected raw data corrected for instrument response. A total of 21 calculations of temperature were made using points extracted from the fitted curve at values from 625 to 925 nm, in 50 nm increments (j=7; N=21). The reported temperature, shown as "Prediction Results" and a tabulation of the 21 pairs is included as Table 6. An average temperature of 3160.0 Kelvins was generated, with a tolerance of ±10.3 Kelvins.

Figure 7:
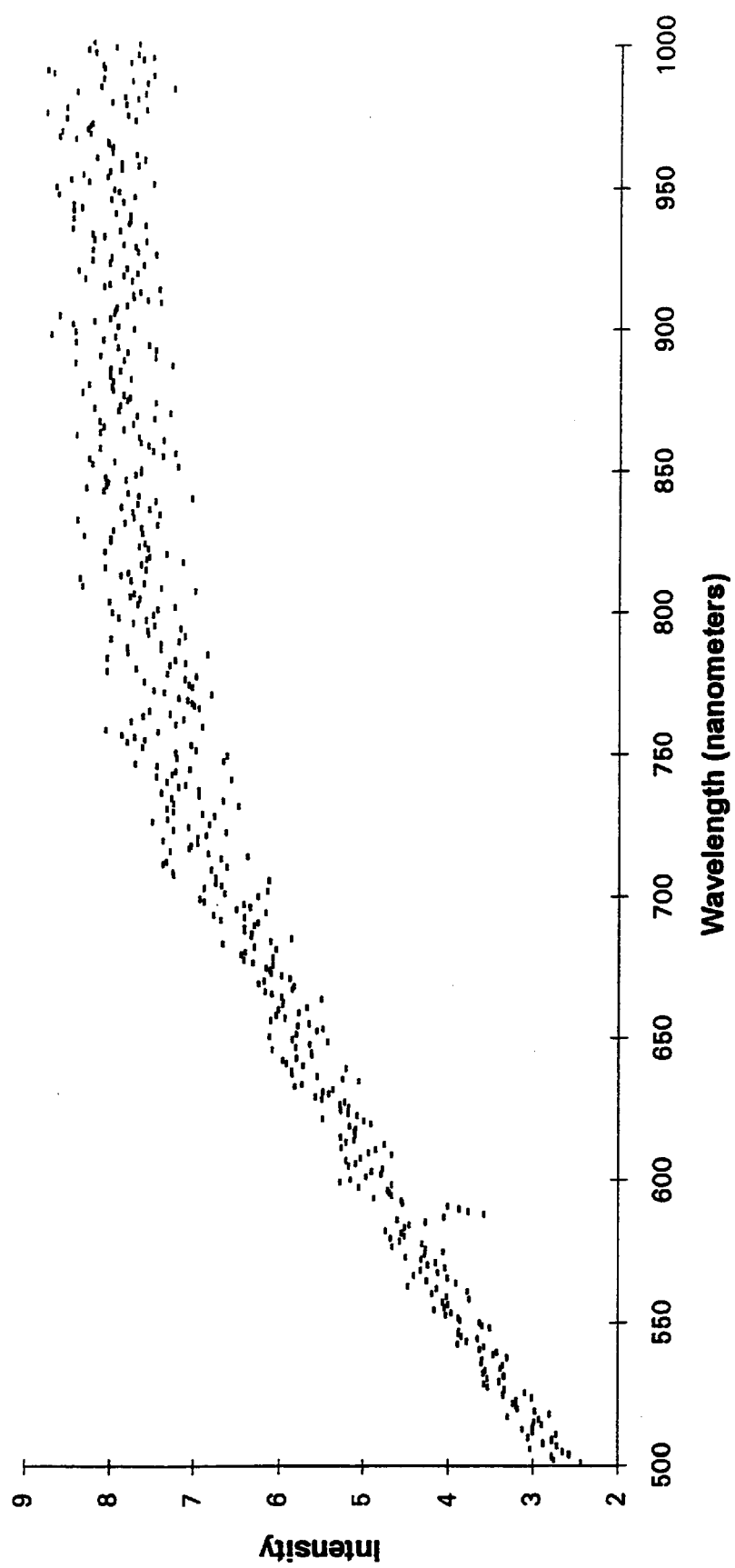

Random error was then added to the data of FIG. 6; a random number generator added a maximum error of ±10% to each value of intensity. FIG. 7 depicts the data with the error added. A cubic expression was then fit to the corrupted data, and the same 21 pairs of intensities as in the original data were evaluated. As shown in Table 7, the present invention reported a temperature of 3172.7 ±23.2 Kelvins. The indicated temperature has changed by 12.2 Kelvins, and the measurement tolerance has increased 12.9 Kelvins. The difference in the temperature calculation has changed less than 0.4% (12.2/3160) while the data has been corrupted by 10%. Moreover, the increase in the measurement tolerance is seen to match almost exactly the change in the reported temperature due to the injected noise (do we need the quotes?). This shows that the tolerance identifies to the user the degree of error in the reported value.

Comparative Example 5(a)

The corrupted data of Example 5, i.e., the data shown in FIG. 7, were evaluated without fitting the data to a mathematical expression. The data point closest to the selected wavelength values (624.4006 nm for "625") were chosen for the temperature calculation.

Table 8 shows that the temperature calculated in the manner of the prior art would change 162 Kelvins, to 3322.0 Kelvins, for a noise-induced error of greater than 5%. The measurement tolerance also increased dramatically, to ±439 Kelvins, indicating that the temperature is no longer well known.

EXAMPLE 6

Figure 8:
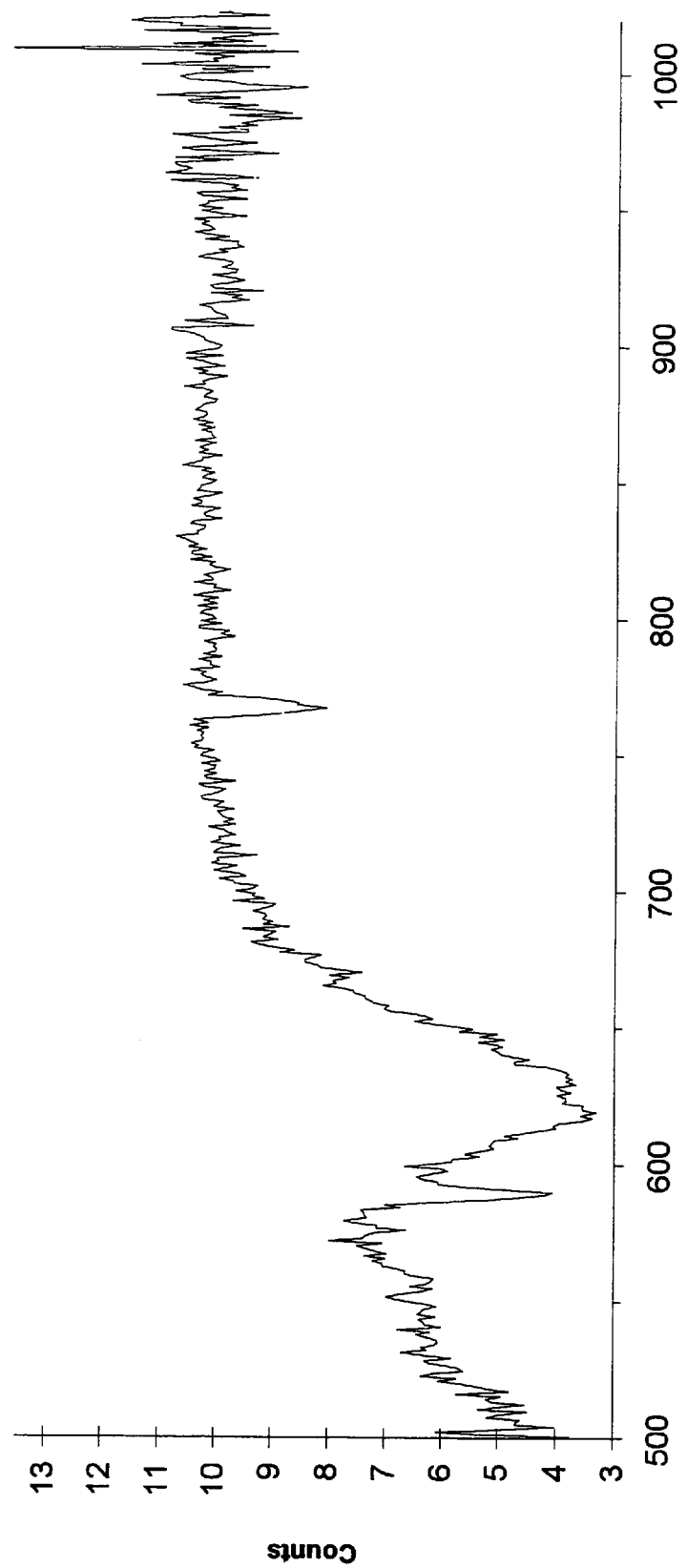
Figure 9:
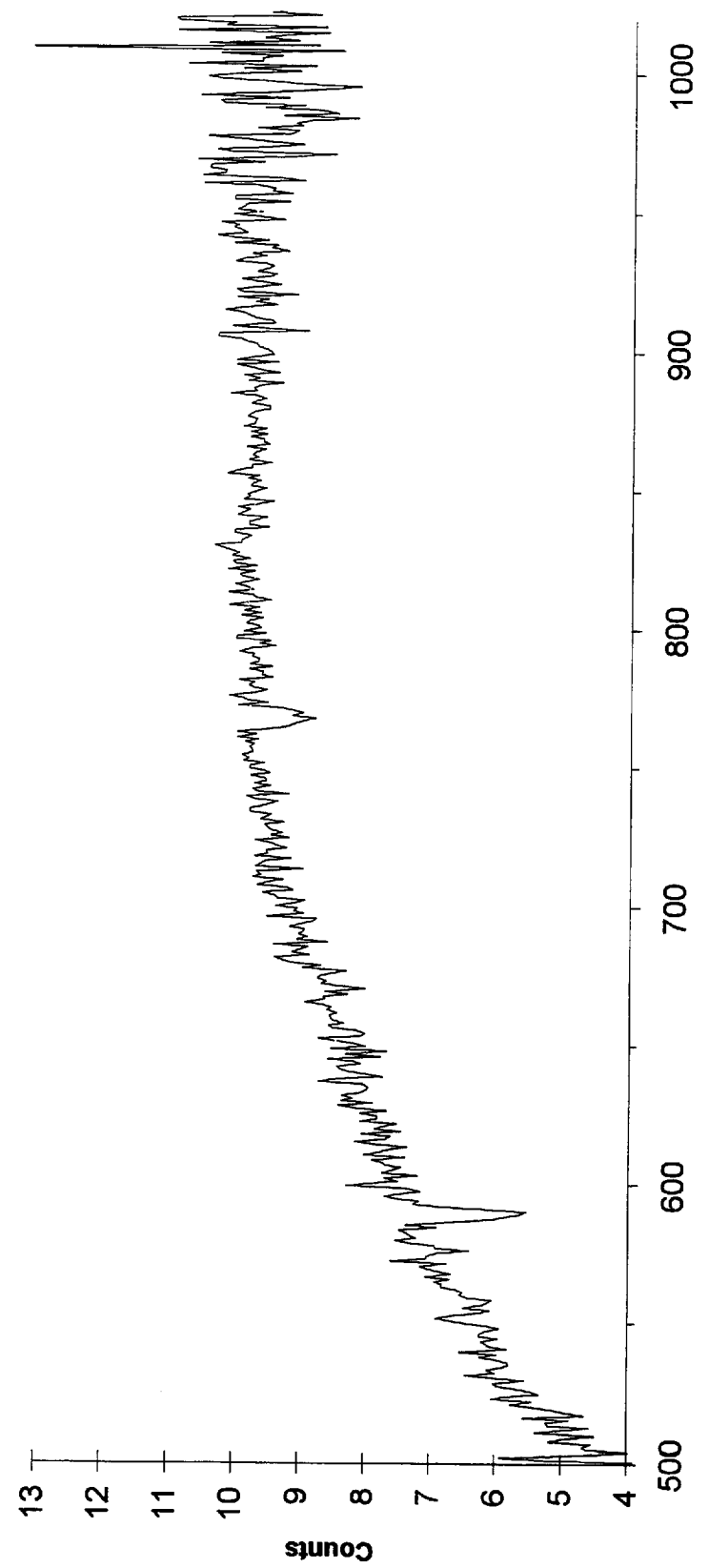

Example 6 illustrates both the ability of the invention to determine the temperature despite interference by absorbing gas and its ability to accurately determine temperatures much greater than 3000° C. FIG. 8 shows spectral data collected from a target in an off-gassing environment with a minimal clearing flow of purge gas. Table 9 shows the temperature calculation performed by the invention for this data. FIG. 9 shows a data collection immediately after that of FIG. 8 with all parameters held constant except for the purge, which had been increased by a factor of six. The absorbing gas had been mostly cleared away and the only absorptions left are the narrow ones at 589 and 767 nanometers. Table 10 is the temperature calculation for these data. As can be seen, the temperatures indicated by both calculations, 3526.7 Kelvins/3253.7° C. for Table 9 and 3519.4 Kelvins/3246.4° C. for Table 10, agree very well showing that the invention operates successfully in the presence of absorbing gas. These also show that the invention is capable of functioning as described well above 3000° C./3273 Kelvins.

EXAMPLE 7

Figure 10:
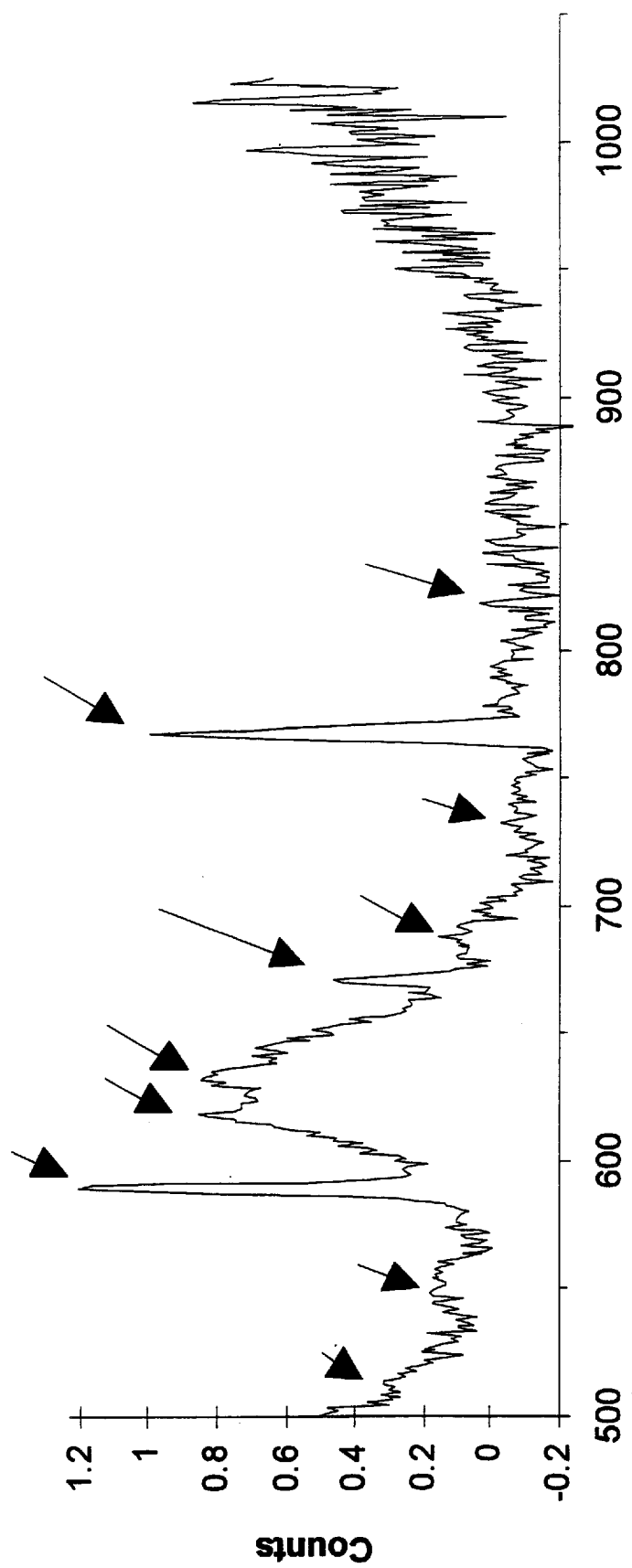

Example 7 illustrates the ability of the invention to provide identification of absorbing chemical species in the environment. A data ensemble such as that represented by the graph of FIG. 8 is the starting point. The invention's output temperature is calculated as has been described. This value of temperature is then substituted into Equation 1 to generate a corresponding Planckian intensity for every wavelength of the data set. The generated intensity is then normalized to the collected data at a point where no nonthermal effects are present (in this case at 800 nanometers). The difference between these two sets of spectral intensities is then calculated, as in FIG. 10, and is the absorption spectrum of the chemical species present. These can be identified using standard tables of chemical spectra. The net effect is that two unknowns, the temperature of the target and the chemical species of the intervening environment, have been quantified by one measurement.

Thus, it should be apparent to those skilled in the art that the subject invention accomplishes the objects set forth above. It is to be understood that the subject invention is not to be limited by the examples set forth herein. These have been provided merely to demonstrate operability, and the selection of specific components and operating methodologies, if any, can be determined from the total specification disclosure provided, without departing from the spirit of the invention herein disclosed and described, the scope of the invention including modifications and variations that fall within the scope of the attached claims.

TABLE 1

| | All values in Degrees C. | | |
|---|---|---|---|
| Setpoint | Temperature Indicated | Difference | Tolerance |
| 1600 | 1603.3 | 3.3 | 8.17 |
| | 1603.3 | 3.3 | |
| 1700 | 1700.3 | .3 | 8.38 |
| | 1700.4 | .4 | 8.37 |
| 1800 | 1798.2 | −1.8 | 7.92 |
| | 1798.4 | −1.6 | 7.92 |
| 1900 | 1897.8 | −2.2 | 7.14 |
| | 1897.8 | −2.2 | 7.14 |
| 2000 | 2001.5 | 1.5 | 7.98 |

TABLE 1-continued

All values in Degrees C.

| Setpoint | Temperature Indicated | Difference | Tolerance |
|---|---|---|---|
|  | 2001.5 | 1.5 | 8.07 |
| 2100 | 2106.1 | 6.1 | 6.45 |
|  | 2106.1 | 6.1 | 6.45 |
| 2200 | 2198.1 | −1.9 | 6.96 |
|  | 2198.2 | −1.8 | 6.90 |

TABLE 2

All temperatures in Deg C.

| Setpoint | Temperature Indicated | Difference | Tolerance |
|---|---|---|---|
| 850 | 855.3 | 5.3 | 15.21 |
|  | 851.4 | 1.4 | 14.73 |
|  | 852.6 | 2.6 | 14.76 |
|  | 857.9 | 7.9 | 15.54 |
|  | 848.2 | −1.8 | 15.05 |
|  | 850.6 | 0.6 | 15.02 |
| 900 | 899.0 | −1.0 | 6.71 |
|  | 898.3 | −1.7 | 6.90 |
|  | 900.7 | .7 | 6.36 |
|  | 898.2 | −1.8 | 6.85 |
|  | 898.3 | −1.7 | 7.43 |
| 1000 | 998.3 | −1.7 | 2.90 |
|  | 1002.6 | 2.6 | 2.92 |
|  | 1000.5 | .5 | 3.44 |
|  | 1002.4 | 2.4 | 2.86 |
|  | 1001.8 | 1.8 | 2.95 |

TABLE 3

All temperatures in Deg C.

| Setpoint | Temperature Indicated | Difference | Tolerance |
|---|---|---|---|
| 1300 | 1302.9 | 2.9 | 6.54 |
| 1400 | 1397.6 | −2.4 | 10.2 |
| 1500 | 1501.4 | 1.4 | 11.8 |
| 1650 | 1649.9 | −0.1 | 10.4 |

TABLE 4

All temperatures in Deg C.

| Setpoint | Temperature Indicated | Difference | Tolerance |
|---|---|---|---|
| 1600 | 1601.6 | 1.6 | 5.79 |
| 1800 | 1797.2 | −2.8 | 6.29 |
|  | 1797.2 | −2.8 | 6.24 |
| 2000 | 1999.0 | −1.0 | 5.05 |
|  | 1999.0 | −1.0 | 5.05 |
| 2200 | 2195.6 | −4.4 | 3.80 |
|  | 2195.7 | −4.3 | 3.80 |
| 2300 | 2296.7 | −3.3 | 1.21 |
|  | 2299.5* | −0.5 | 5.96 |
| 2500 | 2494.9 | −5.1 | 2.66 |
|  | 2498.0* | −2.0 | 5.78 |

*Difference in repeatability is due to change in apertures between measurements.

TABLE 5

Random Noise Tests

| Generating Temperature Column A | Invention Temperature Column B | Difference (Col B-Col A) | Average Temperature Column D | Difference (Col D-Col A) |
|---|---|---|---|---|
| 2250 | 2250.1 | 0.1 | 2254.3 | 4.3 |
| 2400 | 2398.5 | −1.5 | 2397.9 | −2.1 |
| 2500 | 2502.5 | 2.5 | 2504.6 | 4.6 |
| 2600 | 2601.5 | 1.5 | 2604.5 | 4.5 |
| 2700 | 2705.3 | 5.3 | 2708.3 | 8.3 |

TABLE 6

Prediction Results Temp = 3160.0 Tol = 10.3 N = 21 $r^2$ = .99063

|  | 675 | 725 | 775 | 825 | 875 | 925 |
|---|---|---|---|---|---|---|
| 625 | 3140 | 3155 | 3160 | 3160 | 3159 | 3156 |
| 675 |  | 3173 | 3174 | 3170 | 3165 | 3162 |
| 725 |  |  | 3174 | 3168 | 3163 | 3158 |
| 775 |  |  |  | 3162 | 3156 | 3151 |
| 825 |  |  |  |  | 3149 | 3144 |
| 875 |  |  |  |  |  | 3138 |

Data File: f3213m2.dat

TABLE 7

Prediction Results Temp = 3172.7 Tol = 23.2 N = 21. $r^2$ = .91024

|  | 675 | 725 | 775 | 825 | 875 | 925 |
|---|---|---|---|---|---|---|
| 625 | 3146 | 3168 | 3177 | 3180 | 3175 | 3167 |
| 675 |  | 3195 | 3198 | 3194 | 3186 | 3173 |
| 725 |  |  | 3201 | 3194 | 3183 | 3166 |
| 775 |  |  |  | 3186 | 3170 | 3152 |
| 825 |  |  |  |  | 3154 | 3132 |
| 875 |  |  |  |  |  | 3108 |

Data File: F3213M2R.TXT

TABLE 8

Prediction Results Temp = 3322.0 Tol = 439. N = 21.

|  | 675 | 725 | 775 | 825 | 875 | 925 |
|---|---|---|---|---|---|---|
| 625 | 3030 | 2898 | 3242 | 3092 | 3164 | 3240 |
| 675 |  | 2758 | 3393 | 3120 | 3214 | 3310 |
| 725 |  |  | 4619 | 3391 | 3462 | 3555 |
| 775 |  |  |  | 2603 | 3009 | 3235 |
| 825 |  |  |  |  | 3646 | 3789 |
| 875 |  |  |  |  |  | 3971 |

Data File: F3213M2R.TXT

TABLE 9

Prediction Results Temp = 3526.7 Tol = 45.3 N = 28. $r^2$ = .98044

|  | 575 | 625 | 675 | 725 | 775 | 825 | 875 |
|---|---|---|---|---|---|---|---|
| 525 | 3377 | 3442 | 3477 | 3495 | 3505 | 3506 | 3502 |
| 575 |  | 3521 | 3544 | 3553 | 3554 | 3549 | 3539 |
| 625 |  |  | 3571 | 3574 | 3569 | 3560 | 3545 |
| 675 |  |  |  | 3576 | 3568 | 3554 | 3536 |
| 725 |  |  |  |  | 3558 | 3542 | 3519 |
| 775 |  |  |  |  |  | 3522 | 3495 |
| 825 |  |  |  |  |  |  | 3464 |

Data File:f3 220m2.und

TABLE 10

Prediction Results Temp = 3519.4 Tol = 20.9 N = 21. r² = .97263

|     | 600  | 650  | 700  | 750  | 800  | 850  |
|-----|------|------|------|------|------|------|
| 550 | 3556 | 3553 | 3543 | 3533 | 3527 | 3525 |
| 600 |      | 3549 | 3535 | 3524 | 3517 | 3516 |
| 650 |      |      | 3520 | 3507 | 3501 | 3504 |
| 700 |      |      |      | 3493 | 3490 | 3496 |
| 750 |      |      |      |      | 3486 | 3498 |
| 800 |      |      |      |      |      | 3513 |

DataFile: f3221m2.und

I claim:

1. A process for determining the temperature of a radiating body, comprising:
   a) quantifying the radiation intensity emitted by a radiating body at no less than 4 distinct wavelengths;
   b) generating a mathematical function which represents said quantified radiation intensities at the corresponding wavelength at which said radiation intensity was quantified;
   c) selecting no less than two specific wavelengths;
   d) generating a spectral intensity using said mathematical function for each of said wavelengths; and
   e) determining an individual two-wavelength temperature value of said radiating body utilizing the radiation equation $$T_{12} = \frac{C'(1/\lambda_1 - 1/\lambda_2)}{\ln R - 5\ln(\lambda_2/\lambda_1)}$$

where $T_{12}$=individual two-wavelength temperature,
$\lambda_1, \lambda_2, \ldots \lambda_n$=specific wavelengths selected,
$C'$=second radiation constant, and
R=ratio of the generated spectral intensity $I_1$, calculated using said mathematical function at $\lambda_1$, to the generated spectral intensity $I_2$, calculated using said mathematical function at $\lambda_2$.

2. The process of claim 1, wherein said selection step comprises selecting no less than three specific wavelengths; and wherein said determining an individual two-wavelength temperature value step comprises determining an individual two-wavelength temperature value of said radiating body utilizing said radiation equation for each pair of said specific wavelengths selected and said spectral intensity generated utilizing each of said specific wavelengths.

3. The process of claim 2, wherein only said quantified radiation intensity which exhibits emission spectra consistent with known thermal radiation effects is utilized for generation of said mathematical function.

4. The process of claim 2, wherein said generated spectral intensities are utilized to determine said two-wavelength temperatures at wavelengths at which said quantified radiation intensities exhibit fractional residuals no less than −0.1 and no more than 0.1.

5. The process of claim 2, wherein said generated spectral intensities are utilized to determine said two-wavelength temperatures at wavelengths at which the fractional residuals of said quantified radiation intensities exhibit an RMS value substantially equal to zero.

6. The process of claim 2, wherein an average temperature value is determined by the averaging of said individual two-wavelength temperature values determined for every pair of said specific wavelengths and said spectral intensities.

7. A process for determining the spectral emissivity of a radiating body, comprising
   a) determining the temperature according to claim 6, and
   b) calculating said spectral emissivity using the expression $$\epsilon = \frac{H_\lambda \lambda^5 [e^{hc/\lambda K_B T} - 1]}{2hc^2}$$

where $\lambda$=one of said distinct wavelengths at which the radiation intensity is quantified
$H_\lambda$=the radiation quantified at wavelength $\lambda$,
$\epsilon$=the emissivity,
T=said determined temperature,
h=Planck's constant,
c=the speed of light, and
$k_B$=Boltzmann's constant.

8. A process for measuring the tolerance of the measured temperature of a radiating body, comprising
   a) determining the temperature according to claim 6, and
   b) calculating the statistical variation of said individual two-wavelength temperature values determined utilizing said radiation equation, said no less than three specific wavelengths, and said spectral intensities generated utilizing each of said specific wavelengths.

9. The process of claim 8, wherein said statistical variation is the standard deviation of said average temperature value.

10. A temperature determining device, comprising:
   a) an optical input system which receives a portion of the emitted radiation of a radiating body;
   b) a wavelength dispersion device which separates said emitted radiation according to wavelength;
   c) a transducer which senses said separated radiation and provides a quantified output corresponding to radiation intensity for each wavelength of said emitted radiation;
   d) means for generating a mathematical function to represent said quantified output of said radiation transducer as a function of wavelengths;
   e) means for selecting no less than two specific wavelengths;
   f) means for generating a spectral intensity value at each of said selected specific wavelengths, utilizing said mathematical function; and
   g) means for determining an individual two-wavelength temperature value utilizing no less than two of said spectral intensity values and the radiation equation $$T_{12} = \frac{C'(1/\lambda_1 - 1/\lambda_2)}{\ln R - 5\ln(\lambda_2/\lambda_1)}$$

where $T_{12}$=individual two-wavelength temperature,
$\lambda_1, \lambda_2, \ldots \lambda_n$=specific wavelengths selected,
$C'$=second radiation constant, and
R=ratio of the generated spectral intensity $I_1$, calculated using said mathematical function at $\lambda_1$, to the generated spectral intensity $I_2$, calculated using said mathematical function at $\lambda_2$.

11. The device of claim 10, wherein said means for determining an individual two-wavelength temperature value comprises means for determining a two-wavelength temperature value of said radiating body utilizing said radiation equation for each pair of no less than three specific wavelengths and their corresponding spectral intensities generated utilizing said mathematical function.

12. The device of claim 11, wherein only said quantified output corresponding to radiation intensity which exhibits emission spectra consistent with known thermal radiation effects is utilized for generation of said mathematical function.

13. The device of claim 11, wherein said spectral intensities are generated at wavelengths at which said quantified output corresponding to radiation intensity exhibits fractional residuals no less than −0.1 and no more than 0.1.

14. The device of claim 11, wherein said spectral intensities are generated at wavelengths at which the fractional residuals of said quantified output corresponding to radiation intensity exhibit an RMS value substantially equal to zero.

15. The device of claim 11, wherein a average temperature value is the average of said two-wavelength temperature values determined utilizing said radiation equation.

16. The device of claim 15, further comprising the determination of the tolerance of said average temperature value by calculating the statistical variation of said two-wavelength temperature values.

17. The device of claim 16, wherein said statistical variation is the standard deviation of said average.

* * * * *